Oct. 1, 1929.  M. L. WILSON  1,729,733
STEERING KNOB
Filed June 4, 1928
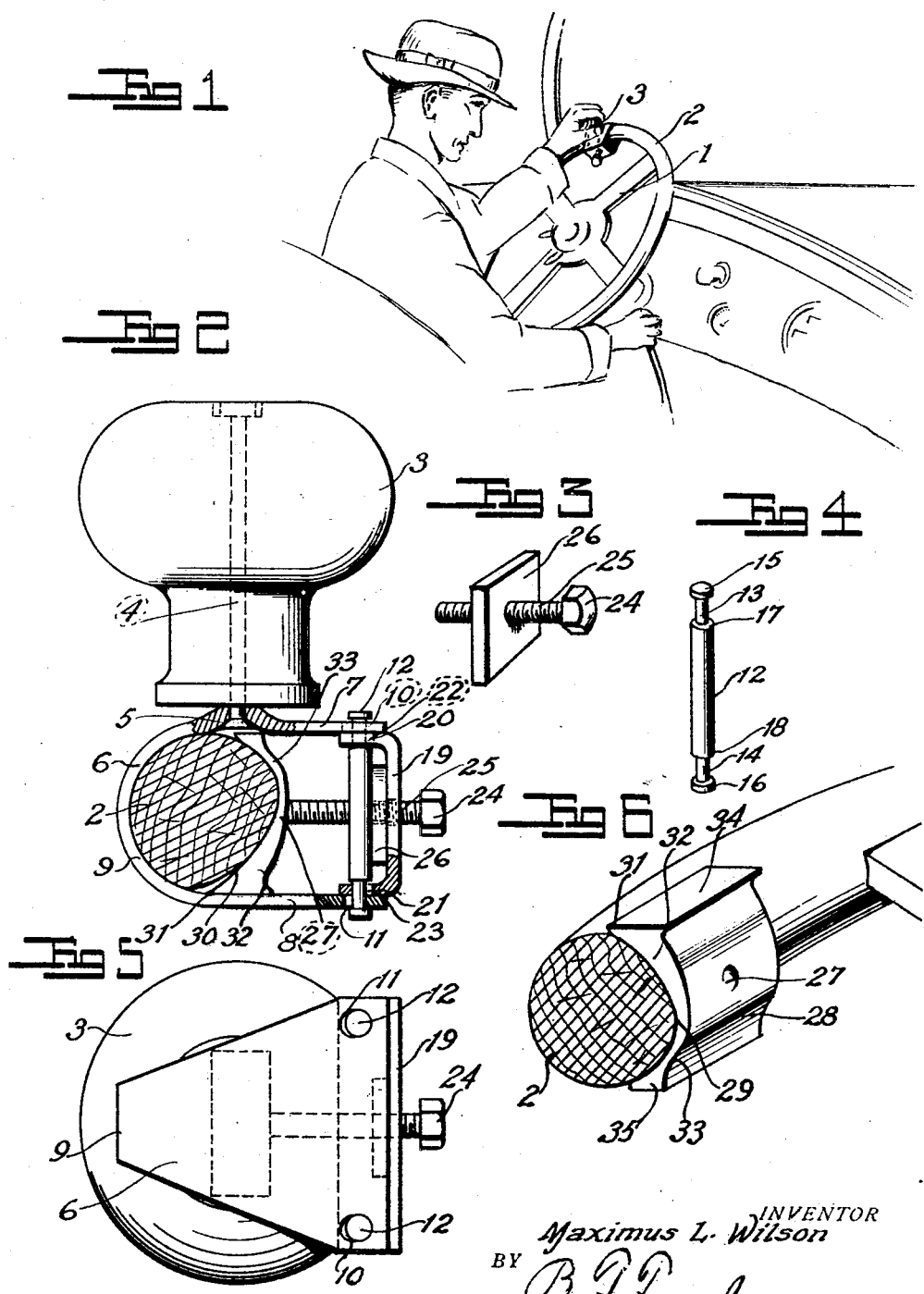

Patented Oct. 1, 1929

1,729,733

UNITED STATES PATENT OFFICE

MAXIMUS L. WILSON, OF WICHITA, KANSAS, ASSIGNOR OF ONE-HALF TO CARL L. KADING, OF WICHITA, KANSAS

STEERING KNOB

Application filed June 4, 1928. Serial No. 282,570.

This invention relates to steering knobs adapted to be conveniently applied to the rim of a steering wheel on any type of motor vehicle, the primary novelty residing in a clamp to provide for the universal application of the knob to different types of wheel rims. The invention facilitates the steering of the motor vehicle by one hand of the operator, leaving the other hand free to signal directions, shift gears or apply the hand brake and the novelty will be understood by reference to the following description in connection with the accompanying drawings in which:

Fig. 1 is a perspective view of the invention applied.

Fig. 2 is an enlarged view of the knob and clamp, the wheel rim being shown in section.

Fig. 3 is a perspective view of the pressure screw and nut.

Fig. 4 is a perspective view of one of the connecting pins.

Fig. 5 is a bottom plan view of the clamp and

Fig. 6 is a perspective view of the rim engaging jaw and part of the rim.

The steering wheel 1 may be of any preferred construction provided with an appropriate rim 2. The knob 3 is provided with a headed pin or bolt 4 adapted to be received in the recess 5 of the yoke 6 of the clamp. The yoke 6 has an upper bar 7, a lower bar 8 and a curved end portion 9 adapted to lie against the curved part of the rim 2. The upper and lower bars 7 and 8 are provided with elongated slots 10 and 11, there being two sets of slots to receive two pins 12, having constricted portions 13 and 14 to provide heads 15 and 16 and shoulders 17 and 18. The yoke may be slipped over the rim of the wheel and attached thereto by co-operating clamping mechanism. Within the space between bars 7 and 8 is a bar 19 having right angular ends 20 and 21 provided with elongated slots 22 and 23, the slots being of such dimensions that the pins 12 may be passed through them as shown in Fig. 2. The bar 19 carries a pressure screw or bolt 24, the threaded portion 25 of which threads into the bar and into the nut 26. The end of the pressure screw 25 is received in a recess 27 in the clamping jaw 28. The face 29 of the clamping jaw 28 is on an irregular curve so that its convexity may fit snugly against the surface of an irregular rim. For example, the portion 30 of the rim 2, in Fig. 2, is less than a true circle so the thickest portion 31 of the jaw 28 will be at the bottom, but if the portion 31, less than a true circle, is at the upper portion of the rim as shown in Fig. 6, then, the thickest portion 32 will be at the top and the narrowest portion 33 will be at the bottom. The top and bottom of the jaw 28 is provided with flat broad ends 34 and 35 to slide against the inner faces of the bars 7 and 8 of the member 6 so that the jaw 28 cannot tilt when it is pressed against the rim.

It is to be understood that the member 6 constitutes the rigid jaw of the clamp and the member 28, the sliding jaw of the clamp and that when it is desired to apply the clamp, the rigid jaw which carries the knob 3 is slipped over the rim, then the bar with the right angular projections 20 and 21 is slipped between the free ends of the bars 7 and 8, then the pins 12 are passed through the openings in the respective bars, the jaw 28 being forced into gripping contact with the rim by the screw 24. The pressure nut 26 will bear against the bar 19 so as pressure is applied, the nut will force the bar 19 outwardly at the same time that the jaw 28 is forced into clamping position. Therefore, the heads 15 and 16 and the shoulders 17 and 18 will be overlapped by the edges of the elongated slots 10, 11, 22 and 23 so that the pins will be locked in place and they in turn will lock the bar 19 to the bars 7 and 8 and pressure of the screw will tightly bind the clamp to the rim, fastening the knob on the rim of the steering wheel so that it will be available to be gripped by the driver of the vehicle so that the steering wheel can be turned with a minimum of effort. I have found that in actual practice, the cross-section of one type of steering wheel will differ from that of another so I have provided for this by making the jaw 28 with a concave face of irregular curvature so that it may be reversed if desired as above explained.

From the foregoing it will be apparent that the clamp with the knob may be conveniently applied and detached, for the latter it being only necessary to ease off the screw so that the elongated slots 10, 11, 22 and 23 will register, then the pins can be taken out, the bar 19 removed and the clamp slipped off the rim.

What I claim and desire to secure by Letters-Patent is:—

1. A steering knob for steering wheels of motor vehicles comprising a hand engaging knob, a clamp carrying the knob for engagement with the wheel rim, said clamp comprising a rigid jaw member having spaced parallel arms, a connecting bar for the arms, means removably securing the connecting bar to the arms, a pressure screw carried by the bar and a movable jaw slidable between the parallel arms actuated by the screw into rim engaging position and having a rim engaging face.

2. A steering knob for steering wheels of motor vehicles comprising a hand engaging knob, a clamp carrying the knob for engagement with the wheel rim, said clamp comprising a rigid jaw member having spaced parallel arms, a connecting bar for the arms, means removably securing the connecting bar to the arms, a pressure screw carried by the bar and a movable jaw slidable between the parallel arms actuated by the screw into rim engaging position and having a rim engaging face, the rim engaging face having an irregular concave formation.

3. An attachment for steering wheels comprising a knob, a clamp carried by the knob having a fixed jaw and a removable jaw, a removable bar in co-operative relation with the fixed jaw having elongated slots alining with elongated slots in the fixed jaw, pins insertable through the slots having restricted portions forming heads and shoulders so that movement of the bar with respect to the fixed jaw will cause the edges of the slots to overlap the heads and shoulders to cause the pins to secure the bar to the fixed jaw and a pressure screw carried by the bar for actuating the movable jaw in co-operative clamping position with respect to the fixed jaw.

4. An attachment for steering wheels comprising a knob, a clamp carried by the knob having a fixed jaw and a removable jaw, a removable bar in co-operative relation with the fixed jaw having elongated slots alining with elongated slots in the fixed jaw, pins insertable through the slots having restricted portions forming heads and shoulders so that movement of the bar with respect to the fixed jaw will cause the edges of the slots to overlap the heads and shoulders to cause the pins to secure the bar to the fixed jaw, a pressure screw carried by the bar for actuating the movable jaw in co-operative clamping position with respect to the fixed jaw and a pressure nut on the pressure screw bearing against the bar.

5. An attachment for steering wheels comprising a clamp consisting of a fixed jaw having two bars and a curved portion connecting them, slots in the bar, a third bar having right angular projections with slots to aline with the slots in the first named bars and in the third bar, a movable bar slidable between the first two bars, a pressure nut bearing against the third bar, a pressure screw passing through the third bar and through the nut, the end of the pressure screw bearing against the movable jaw and a knob carried by the clamp.

6. An attachment for steering wheels of motor vehicles comprising a clamp consisting of a movable jaw and a fixed jaw, the movable jaw having a concave portion generated on an irregular curve, a pressure screw for actuating the movable jaw and a knob carried by the fixed jaw.

7. An attachment for steering wheels of motor vehicles comprising a clamp consisting of a rigid jaw having an open end, a bar co-operating with the rigid jaw and removably attached thereto, a movable jaw carried by the rigid jaw having a rim engaging face of irregular curvature, a nut bearing against the bar, a movable jaw actuating screw passing through the bar and in threaded engagement with the nut and a knob carried by the rigid jaw.

In testimony whereof I affix my signature.

MAXIMUS L. WILSON.